(Model.)
G. J. CLARK.
CHURN.
No. 328,188. Patented Oct. 13, 1885.
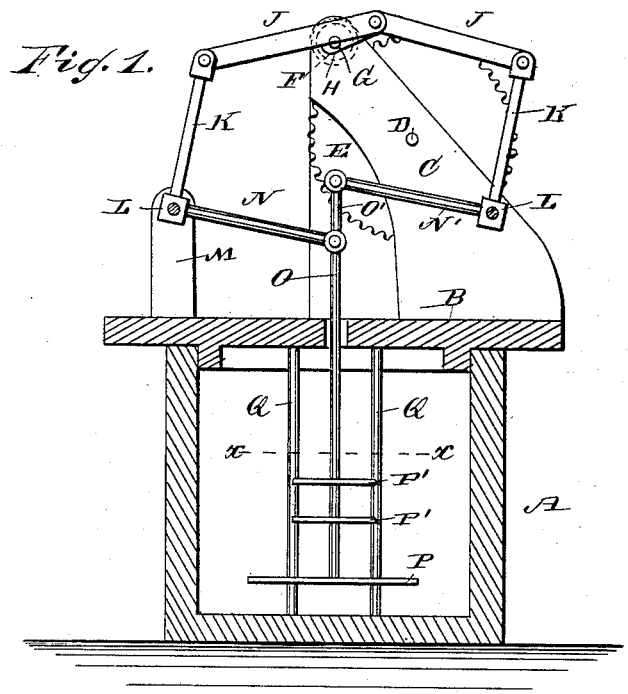
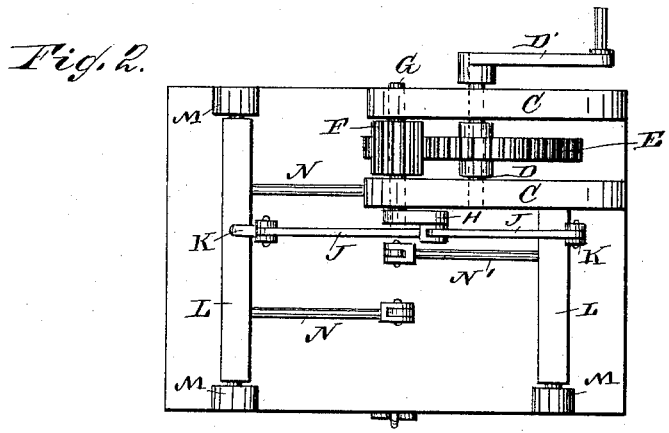
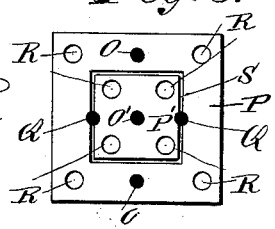
WITNESSES:
Theo. G. Hoster
C. Sedgwick
INVENTOR:
G. J. Clark
BY Munn & Co
ATTORNEYS.

UNITED STATES PATENT OFFICE.

GEORGE JEFFERSON CLARK, OF AYERSVILLE, OHIO.

CHURN.

SPECIFICATION forming part of Letters Patent No. 328,188, dated October 13, 1885.

Application filed September 1, 1884. Serial No. 141,980. (Model.)

*To all whom it may concern:*

Be it known that I, GEORGE J. CLARK, of Ayersville, in the county of Defiance and State of Ohio, have invented a new and Improved Churn, of which the following is a full, clear, and exact description.

The invention consists in the construction and arrangement of parts, as will be hereinafter fully described and claimed.

Reference is to be had to the accompanying drawings, forming a part of this specification, in which similar letters of reference indicate corresponding parts in all the figures.

Figure 1 is a longitudinal sectional elevation of my improved churn. Fig. 2 is a plan view of the same. Fig. 3 is a sectional plan view on the line $x\ x$, Fig. 1.

The cream box or tub A is provided with a cover, B, provided with two standards or uprights, C, in which a shaft, D, having a crank-handle, D', is journaled, a cog-wheel, E, being rigidly mounted on the shaft D between the standards, and engaging with a pinion, F, on a shaft, G, journaled in the standards C, and provided at one end with a crank, H, the free end of which is connected by rods J with arms K, projecting upwardly from two parallel rocking shafts, L, journaled in standards M on one end of the cover and standard M and upright C at the other end of the cover.

From one rocking shaft L two arms, N, project, and between them an arm, N', projects from the other shaft L, the arms N N' projecting toward each other, and being at right angles to the arms K.

To the free ends of the arms N rods O are pivoted, which pass through apertures in the cover and have their lower ends connected with a square or other horizontal dasher-plate, P, adapted to slide on guides Q, projecting downward from the cover.

To the end of the arm N' a downwardly-projecting rod, O', is pivoted, which has its lower end secured to two horizontal dasher-plates, P', adapted to pass vertically through an opening, S, in the dasher-plate P, and held to slide vertically between the guides Q. The dasher-plates P and P' are provided with a series of apertures, R.

By turning the crank-handle D' the pinion F is revolved, and the shafts are rocked, and the rods O O' and the dasher-plates P P' on the same are alternately raised and lowered in opposite directions.

The churn runs easily and rapidly, does not require much power, the motion is regular, and the butter is produced rapidly, as the cream is being cut continually.

As the entire churning device is held on the cover, it can be removed easily by lifting off the cover, thus facilitating the cleaning of the cream-box.

Having thus described my invention, what I claim as new, and desire to secure by Letters Patent, is—

1. In a churn, the combination, with the guide-rods Q, extending from the lower face of the churn-cover to the bottom of the churn, of the horizontal dasher-plate P, having a central opening, the inner walls of which rest against said guide-rods, one or more dasher-plates, P', adapted to pass through the openings in the plate P and guided at opposite sides between the said rods, and means for alternately reciprocating said dasher-plates, substantially as set forth.

2. In a churn, the combination, with the rocking shafts L, of the arms N N', the dasher-rods O O', dashers on the same, the shaft G, having a crank, H, the arms K on the rocking shafts, and the rods J, connecting the arms K with the crank H, substantially as herein shown and described.

3. In a churn, the combination, with the dasher-rods O O' and dashers on the same, of the rocking shafts L, having arms N, N', and K, the shaft G, having a crank, H, the connecting-rods J, the pinion F, the cog-wheel E, and the shaft D, having a crank-handle, D', substantially as herein shown and described.

GEORGE JEFFERSON CLARK.

Witnesses:
STEWERT GAYLORD,
JAMES E. B. GOOD.